Sept. 5, 1939.  T. A. PETERMAN  2,172,173
FLEXIBLE BEAM WHEEL SUSPENSION
Filed Oct. 12, 1937  3 Sheets-Sheet 1
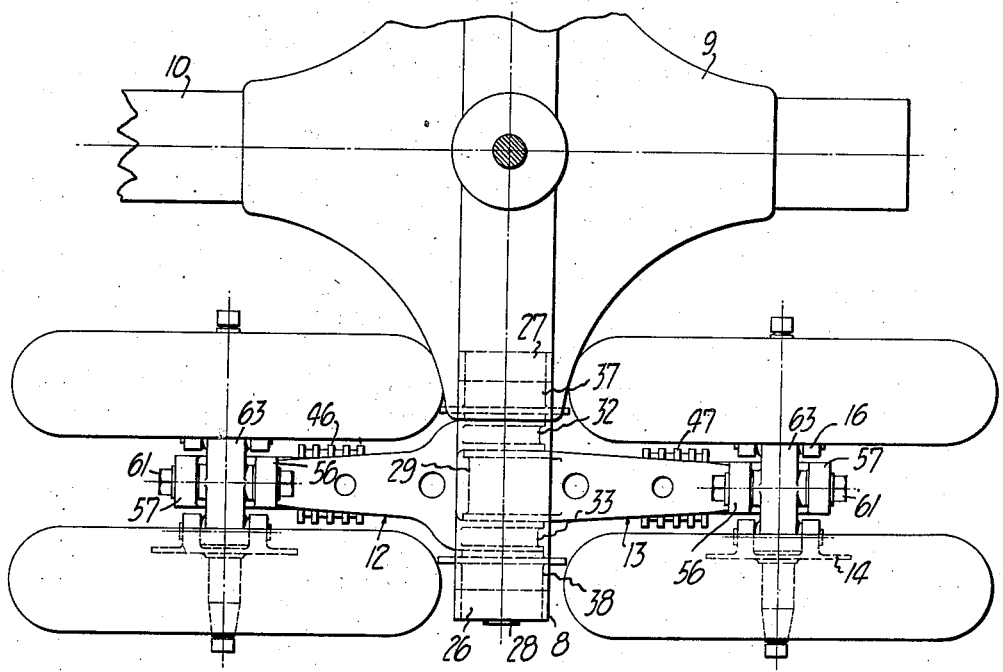
FIG_1_
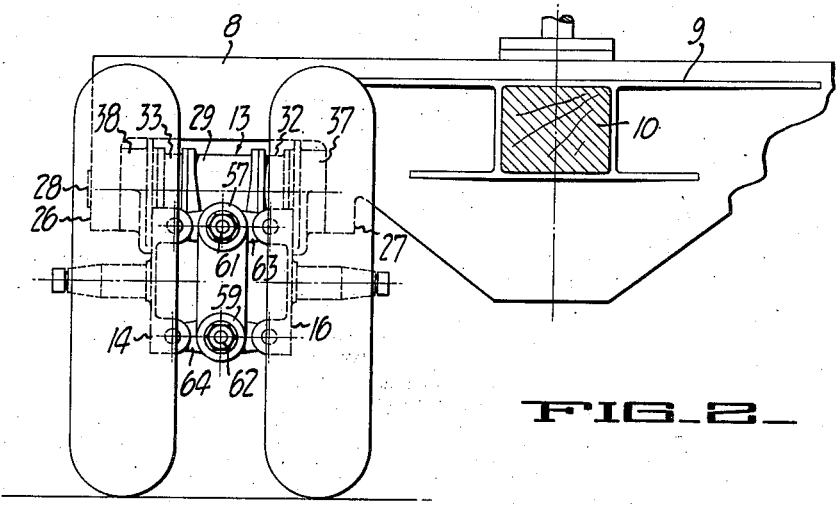
FIG_2_
INVENTOR.
Theodore A. Peterman
BY
ATTORNEY.

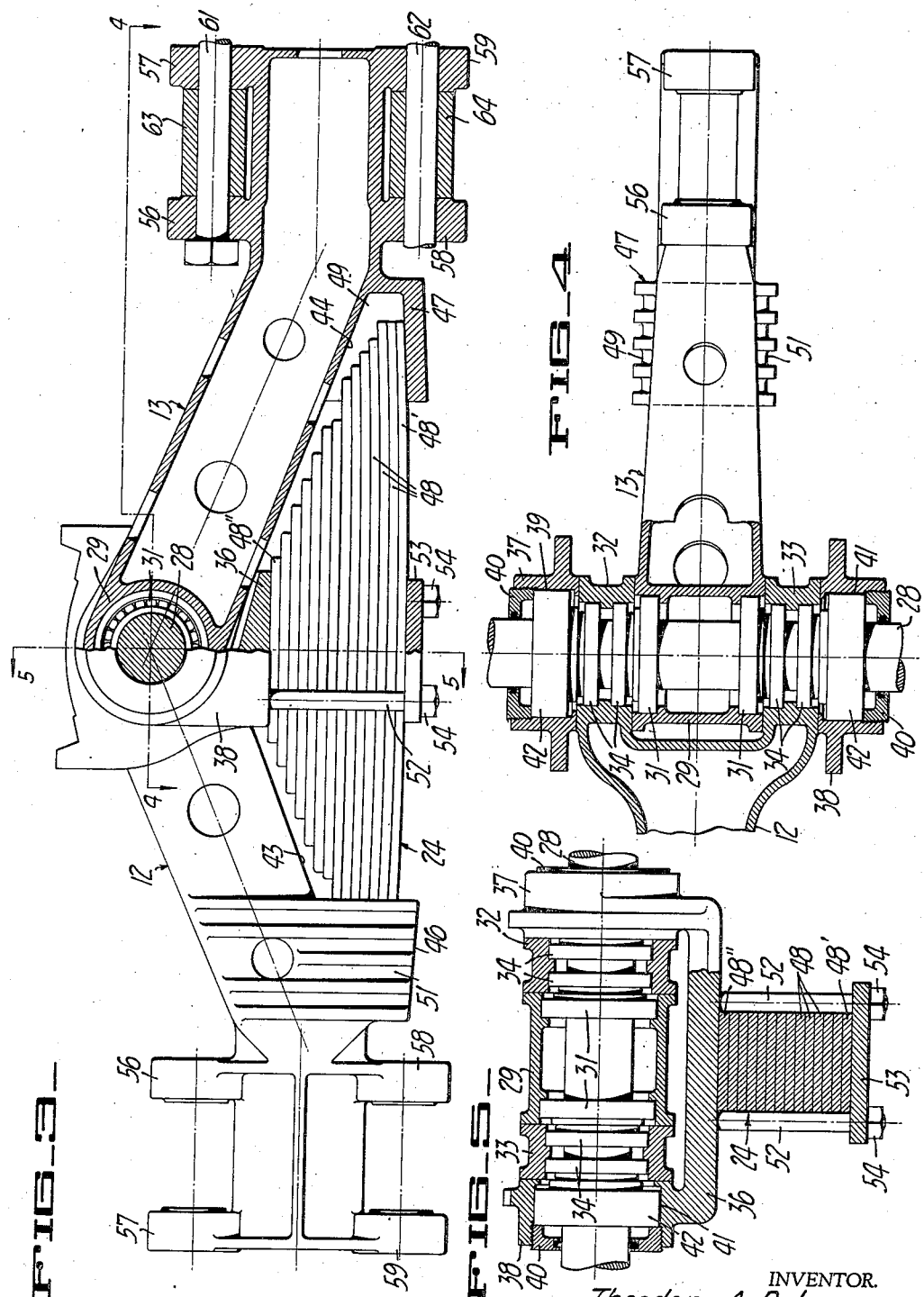

Sept. 5, 1939.     T. A. PETERMAN     2,172,173
FLEXIBLE BEAM WHEEL SUSPENSION
Filed Oct. 12, 1937     3 Sheets-Sheet 3
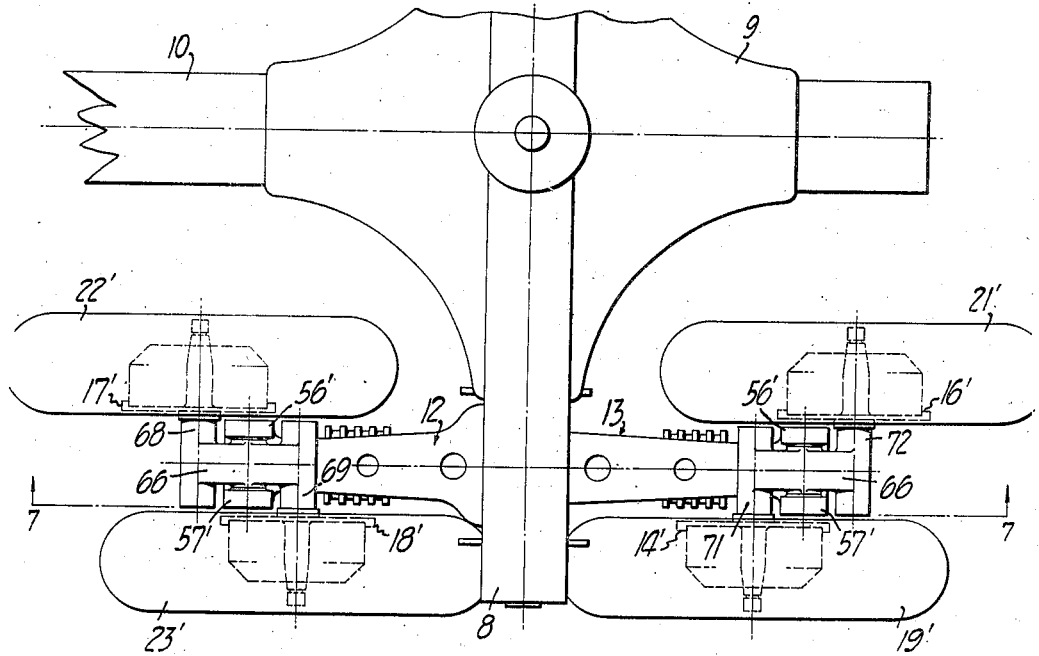
FIG_6_
FIG_7_
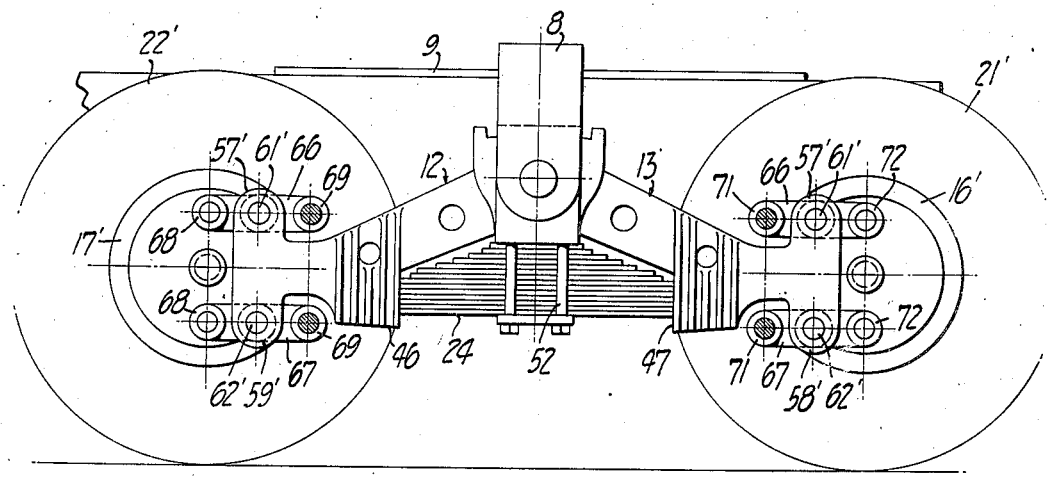
INVENTOR.
Theodore A. Peterman
BY
ATTORNEY.

Patented Sept. 5, 1939

2,172,173

UNITED STATES PATENT OFFICE 2,172,173

FLEXIBLE BEAM WHEEL SUSPENSION

Theodore A. Peterman, Tacoma, Wash.

Application October 12, 1937, Serial No. 168,607

2 Claims. (Cl. 280—124)

The present invention relates to vehicle construction and more particularly to wheel suspensions for vehicles.

Wheel suspensions for vehicles of the type wherein certain or all of the wheels are individually suspended from the vehicle frame for individual vertical displacement relative thereto, have been rather widely used, particularly in the lighter weight vehicles, for reducing the amount of road shock transmitted from the wheels to the vehicle. Such construction is now widely used in the suspension of the front wheels of automobiles to permit individual vertical displacement of either of the wheels.

Considerably less has been accomplished in the design of such flexible and individual wheel suspensions for larger types of vehicles such as trucks and trailers, due, in part, to the inherent weakness of prior constructions which renders them unfit or at least unsafe for heavy loads, and the fact that such former constructions are not adaptable to the multiple wheel constructions used in heavy trucks and trailers. Considerable advantages are to be derived from the use of a wheel suspension on trucks and trailers which will minimize road shock and disturbance of the load caused by unevennesses in the terrain encountered by the several wheels of the vehicle, since such provision will also permit the vehicle to be loaded to nearer its capacity.

Having in mind the foregoing and other deficiencies of prior vehicles of this general character, it is an object of my invention to provide a wheel suspension of the character described which will combine the advantages of individual wheel supports with the advantages of a stable axle or frame support whereby the reduction in transmission of road shock to the vehicle frame may be effected without sacrificing strength and rigidity of the structure.

Another object of the invention is to provide a wheel suspension which is adapted to support a plurality of wheels upon the vehicle frame, and which will permit a vertical movement of such wheels relative to each other, as well as relative to the vehicle frame, without incurring any torsional or other compounding of the strain on the wheel suspension.

A further object of the invention is to provide a suspension which will minimize the lateral swaying of the vehicle and load when the vehicle encounters minor irregularities in the terrain traversed by its several wheels.

The novel features characteristic of my invention are set forth with particularity in the appended claims. The invention itself, however, together with additional objects and advantages thereof, will be best understood from the following description of specific embodiments thereof, when read in connection with the accompanying drawings, in which:

Figure 1 is a plan view of a part of a vehicle frame embodying the wheel suspension of my invention;

Figure 2 is an end elevation of the wheel suspension illustrated in Figure 1;

Figure 3 is a side elevation, shown part in section, of my wheel suspension;

Figure 4 is a plan and sectional view of the wheel suspension taken substantially on the plane of line 4—4 of Figure 3;

Figure 5 is a transverse vertical sectional view taken substantially on the plane of line 5—5 of Figure 3;

Figure 6 is a plan view similar to Figure 1, but showing a modified form of the wheel suspension;

Figure 7 is a longitudinal sectional view of the wheel suspension taken substantially on the plane of line 7—7 of Figure 6.

The wheel suspension of the present invention, as illustrated in the accompanying drawings, consists in general of a resilient or shock-absorbing means which is mounted on the vehicle frame and which supports a plurality of wheel suspensions so as to permit limited resilient individual vertical movement of the wheels, but which, on movement in excess of such limited movement, provides a relatively solid connection between the several wheels and the frame. In this manner the wheels are permitted an individual vertical displacement relative to the frame upon traversing minor irregularities in the terrain, but are connected with the other wheels and the frame for movements in excess of those caused by such minor irregularities so that the wheel suspension unit will have sufficient strength and rigidity to support the frame and wheels when subjected to severe or excessive road shocks.

In accordance with the present invention, the wheels are suspended in tandem by a beam or other member pivoted to and depending from the vehicle frame. In prior constructions of this general nature, it has been impractical to mount a plurality of wheels in tandem upon the free end of such beam, because road shock encountered by only one wheel at one side of the beam would subject the beam and its pivotal connection to the frame to a severe torsional strain. In accordance with the present construction, however, a plurality of wheels are mounted in tandem at the free end of such a beam in a manner such that this torsional stress is entirely eliminated and the amount of vertical road shock is greatly decreased. This is accomplished, in the present construction, by mounting wheels at both sides of the lower end of a beam of the character described and pivoting the hub supporting members of such wheels to the beam by a parallel linkage, whereby the wheels are, in effect, universally mounted upon the vehicle frame. In this manner any variation in vertical displacement of the wheels at opposite sides of the beam merely results in movement of the wheels with respect to the beam, or in the application of a lifting force to the free end of the beam without subjecting the beam to a torsional stress as heretofore.

With reference more particularly to the drawings, the present wheel suspension is illustrated as disposed at the ends of a transverse bolster 8 of a vehicle frame 9. For simplicity of illustration and description, only one side of the frame is illustrated, and a second wheel suspension of the same type will be duplicated at the opposite side of the frame. In the present instance, the body 9 is provided with a longitudinally extending portion 10, which may be used as a draft tongue in a trailer, or which may be part of a longitudinal frame in a truck or similar vehicle.

As will be best seen from Figures 1, 3 and 4, the wheel suspension consists essentially in a pair of forwardly and rearwardly extending beams 12 and 13, which are co-axially pivoted along a horizontal, transversely extending axis to depending arms of the bolster 8. The beams are supported by a single spring or shock-absorbing means 24, which is also pivoted to the bolster 8 co-axially with the beams 12 and 13, and which is connected to said beams so as to permit a limited individual vertical movement of the outer free ends thereof, and, at the same time, maintain a resilient connection between them. With reference to Figure 2, the outer end of the bolster 8 is provided with a pair of transversely spaced depending lugs 26 and 27 which support the ends of a transverse horizontal bearing pin 28 forming a pivotal support for the beams 12 and 13, and the spring 24. The beams here shown are of hollow rectangular section and the beam 13 (see Figure 4) is provided with a cylindrical bearing portion 29, which is supported by roller bearings 31 on the pin 28. The pivotal end of the beam 12 is bifurcated to provide a pair of transversely spaced cylindrical bearing portions 32 and 33 which straddle the end of the beam 13 and are journalled upon roller bearings 34 on the bearing pin 28.

The spring 24 is pivoted to the pin 28 by means of a bracket 36 (Figures 3 and 4), which is here shown in the form of a yoke having transversely spaced legs 37 and 38 which are provided with cylindrical bearing portions 39 and 41 which straddle the end portions 32 and 33 of the beam 12 and are journalled on the pin 28 by means of roller bearings 42. Preferably, the arrangement of the beams 12 and 13 and the spring bracket 36 is such that the end portions 32 and 33 of the beam 12 slidably engage the sides of the beam 13 while the inner sides of the bracket slidably engage the outer sides of the beam ends 32 and 33 so as to define a continuous longitudinal passage through several bearing portions between the pin and the several members. This enclosure facilitates lubrication of the several members and, preferably, packing glands 40 are provided at the outer sides of the bracket bearing portions so as to confine lubricants in the enclosure.

As will be clear from Figure 3, the beams 12 and 13 extend downwardly and longitudinally from the pivot pin 28 at opposite sides thereof and are formed on their under and opposed sides 43 and 44 with horizontally extended spring seats or sockets 46 and 47. In accordance with the present arrangement, the spring 24 is made up of a plurality of flat leaves 48 which are stacked in a vertical tier and are graduated in decreasing lengths vertically so as to lie between and spaced from the under sides 43 and 44 of the beams. The bottom leaf 48' bears directly on the spring seats 46 and 47 and while confined in its movement transversely of the beams by side walls 49 and 51, may slide freely, longitudinally of the beams, on the seats 46 and 47. The uppermost leaf 48'' of the spring engages directly against the underside of the bracket 36 and the spring assembly is clamped thereto by means including stud bolts 52, clamping plate 53, and nuts 54.

It will thus be seen that the individual vertical movement of the outer ends of the beams is resiliently resisted by one side of the spring so that while such individual movement is permitted within relatively narrow limits, the spring will, on further movement, act as a semi-rigid connection between the beams 12 and 13, causing the latter to move as a unit about the bearing pin 28.

Firstly, whatever transient individual movement of one of the beams is permitted by the flexing of the adjacent side of the spring, is entirely absorbed in the spring itself, and the beam merely rotates about its pivotal connection to the frame and none of this movement is therefore transmitted to the frame. Secondly, where there is excess or other than transient movement of the beam end, only one-half of the vertical component of such movement is transmitted to the frame, since the semi-rigid connection between the beams will cause the beams to move as a lever about their intermediate fulcrums on the frame. It will thus be understood that, under severe and heavy loads, the wheel suspension has all of the desirable attributes of a rigid beam support between the wheels and frame, while at the same time it greatly decreases the transmission of road shock from the wheels to the frame.

As previously mentioned, one of the features of the present wheel suspension is the provision of means for mounting a plurality of wheels in tandem at opposite sides at the lower free ends of beams of the character described, without subjecting the beams and their pivotal connections to the frame to torsional stress when the wheels at the opposite sides at the beams are subjected to unequal road shock. This is here effected as above indicated by mounting the wheels on the opposite sides of the beam by means of a parallel linkage suspension. By this means the wheels are also maintained at all times in parallel vertical position.

In the preferred embodiment of the invention, as best illustrated in Figures 1, 2 and 3, the outer end of each of the beams 12 and 13 is provided with longitudinally spaced upstanding lugs 56 and 57, and longitudinally spaced depending lugs 58 and 59 which are substantially vertically aligned with the lugs 56 and 57. Carried by these lugs are a pair of transverse horizontal pins 61 and 62 which are positioned respectively above and below the beam end. Journalled on these pins are upper and lower transversely extended levers 63 and 64, which extend laterally and are pivoted at their outer ends to the wheel hub supporting members such as the ones indicated at 14 and 16 in Figure 2. It will be noted that the axes of the pins 61 and 62 are horizontal and at substantially right angles to the axis pivotal connection of the beams with the frame. In this manner, the wheel carried at the opposite sides of the beams are free to move vertically about their pivotal axes with the beams and thus the vertical component only of the movement is transmitted to the beam, all possibility of torsional stress being thereby avoided.

It will also be noted that, since the levers 63 and 64 are connected at their outer ends to the wheel hub supporting members, and are journalled intermediate their ends to the beams 12 and 13, only one-half of any relative vertical displacement of the wheels mounted thereon will be transmitted to the beam. Also, since the levers 63 and 64 form a parallel linkage connection between the wheel hub supporting members, the latter are constrained to move only in parallel vertical planes.

A modified form of the invention has been illustrated in Figures 6 and 7, wherein the wheels are supported at the opposite sides to the ends of beams 12 and 13 so as to effect a longitudinally offset or staggered relation of the wheels. This is effected by providing transversely spaced upstanding and depending lug portions 56', 57', 58' and 59' at the outer ends of the beams 12 and 13, so as to dispose the bearing pins 61' and 62' in transverse horizontal position at the top and bottom of the beam ends. In this form of the invention, a pair of upper and lower longitudinally extending levers 66 and 67 are journalled on the pins 61' and 62'. In the case of the forward set of wheels 22' and 23', the forward ends of these levers are provided with inwardly transversely extending arms 68, which are pivotally secured to the wheel supporting member 17', while the opposite ends of the levers are provided with transversely outwardly extending arms 69, which are pivotally secured to the wheel supporting member 18'. In the case of the rearward wheels 19' and 21', the forwardly extending ends of the levers are provided with outwardly transversely extending arms 71, which are pivotally secured to the wheel supporting member 14', while the rear ends of the levers are provided with inwardly transversely extending arms 72, which are rotatably secured to the wheel supporting member 16'. By this arrangement also, the wheels are mounted on the beam ends by a parallel linkage suspension so that the vertical component only of the wheel movements relative to the beams 12 and 13 will be transmitted to the beams and no torsional stress will be transmitted to the beams or their pivotal connections.

One of the advantages of this form of the invention lies in the fact that one of the pair of wheels at opposite sides of the beam ends is positioned forwardly of the other wheel, so that irregularities in the road surface extending transversely across the road will be transversed, first by one wheel, and then the other. Thus, in passing of such irregularities, the axes of the wheels will be free to rock about the beam ends, and the amount of movement transmitted to the beam will be considerably decreased.

Although specific embodiments of my invention have been described herein, it will be apparent to those skilled in the art to which the invention appertains that many modifications thereof are possible, and it is understood that the invention is not to be considered as restricted to the forms shown except insofar as is necessitated by the prior art and by the spirit of the appended claims.

I claim:

1. A wheel suspension comprising a frame having a transversely extending frame member provided with transversely spaced depending end portions, a pin supported by said portions, a beam journalled on said pin, a second beam having a bifurcated end journalled on said pin at opposite sides of said first beam, said beams being provided with spring seats adjacent the free ends thereof, a yoke member journalled on said pin between said bifurcated end and said pin supporting portions and extending under said pin in spaced relation to said beams, a flat spring extending onto said seats and having a free sliding contact therewith, means for clamping said spring to said yoke member, and road wheels mounted upon the free ends of said beams.

2. A wheel suspension comprising a frame having a transversely extending frame member provided with transversely spaced depending end portions, a pin supported by said portions, a beam journaled on said pin, a second beam having a bifurcated end journaled on said pin at opposite sides of said first beam, said beams being provided with spring seats adjacent the free ends thereof, a yoke member journaled on said pin between said bifurcated end and said pin supporting portions and extending under said pin in spaced relation to said beams, a flat spring extending onto said seats and having a free sliding contact therewith, means for clamping said spring to said yoke member, and a plurality of road wheels disposed at opposite sides of each of said beams and pivotally supported thereon by means constituting a parallel linkage suspension.

THEODORE A. PETERMAN.